Aug. 24, 1965   J. T. MONK ETAL   3,202,221
CULTIVATING APPARATUS FOR CROPS

Filed Jan. 31, 1963   2 Sheets-Sheet 1

INVENTORS.
JAMES T. MONK
RUFUS P. STEADMAN
WILLIAM A. TAYLOR, JR.

BY John R. Walker, III
Attorney

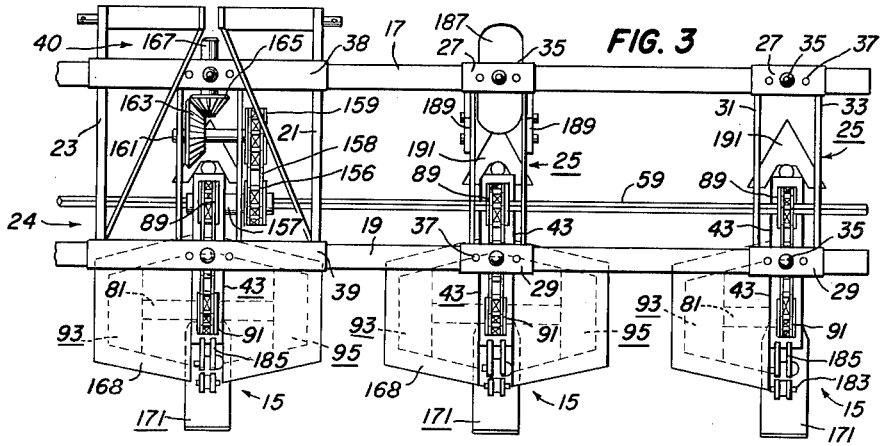
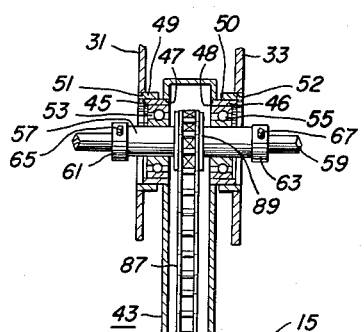
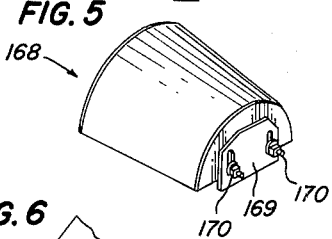
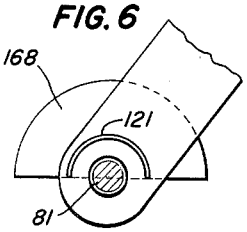
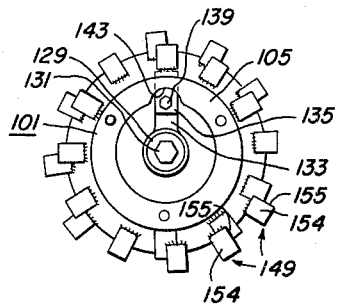
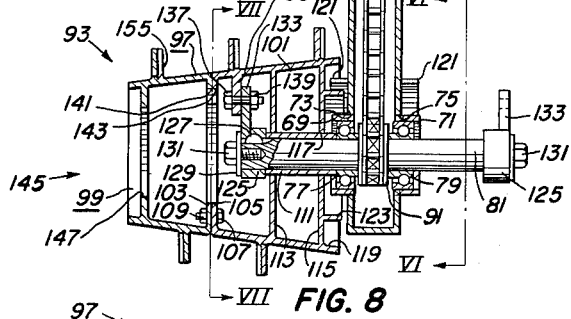
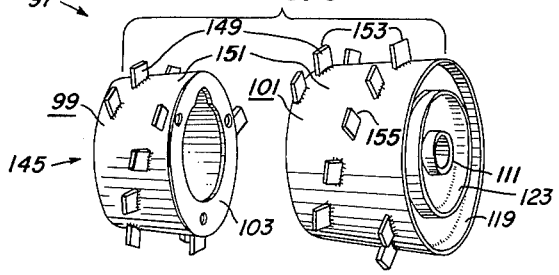

United States Patent Office 3,202,221
Patented Aug. 24, 1965

3,202,221
CULTIVATING APPARATUS FOR CROPS
James T. Monk, William A. Taylor, Jr., and Rufus P. Steadman, Louisville, Miss., assignors to Taylor Machine Works, Louisville, Miss.
Filed Jan. 31, 1963, Ser. No. 255,266
9 Claims. (Cl. 172—63)

This invention relates to a cultivator for crops and is an improvement over that type of device shown in the patent application of Rufus P. Steadman, Serial No. 64,829, filed October 25, 1960, now abandoned.

One of the objects of the present invention is to provide a cultivator having a unique overall arrangement of the various parts thereof so that a greatly improved device is provided for cultivating crops.

A further object is to provide in such a device an improved ground engaging head provided with improved ground engaging projections, whereby a more efficient cultivating action is provided.

A further object is to provide a unique arrangement of the ground engaging projections wherein the projections are substantially rectangular and are at an angle relative to the path of rotation thereof.

A further object is to provide a ground engaging head which is uniquely arranged so that it may be changed in length to accommodate differences in widths of the rows.

A further object is to provide unique driving means for each of the ground engaging heads which is arranged so that if the ground engaging head is accidentally stopped by an external source, such as a rock or the like, a pin will shear and prevent damage to the equipment.

A further object is to provide an improved and more efficient means for moving or pumping the soil laterally relative to the crop row.

A further object is to provide means for pumping the soil either in toward the crop row or outwardly away from the crop row.

A further object is to provide unique means for mounting the individual ground engaging heads so that the heads are independently movable relative to each other.

A further object is to provide adjustable depth control slide means for each of the ground engaging heads so that the ground engaging heads may be adjusted relative to each other and will rise and fall independently of each other during the operation of the device.

A further object is to provide a unique arrangement of the depth control wheels, sweeps, and ground engaging heads wherein the sweeps rise and fall with the wheels and material is swept into the ground engaging heads.

A further object is generally to improve the design and construction of cultivators.

The means by which the foregoing and other objects of the present invention are accomplished and the manner of their accomplishment will be readily understood from the following specification upon reference to the accompanying drawings, in which:

FIG. 3 is an enlarged fragmentary top plan view of the cultivator shown detached from the tractor.

FIG. 4 is an enlarged fragmentary sectional view taken as on the line IV—IV of FIG. 1, with parts removed for purposes of clarity.

FIG. 5 is a perspective view of one of the shields.

FIG. 6 is a fragmentary sectional view taken as on the line VI—VI of FIG. 4.

FIG. 7 is a sectional view taken as on the line VII—VII of FIG. 4.

FIG. 8 is a perspective view of the two sections of the ground engaging head shown in a detached position.

Figure 1:
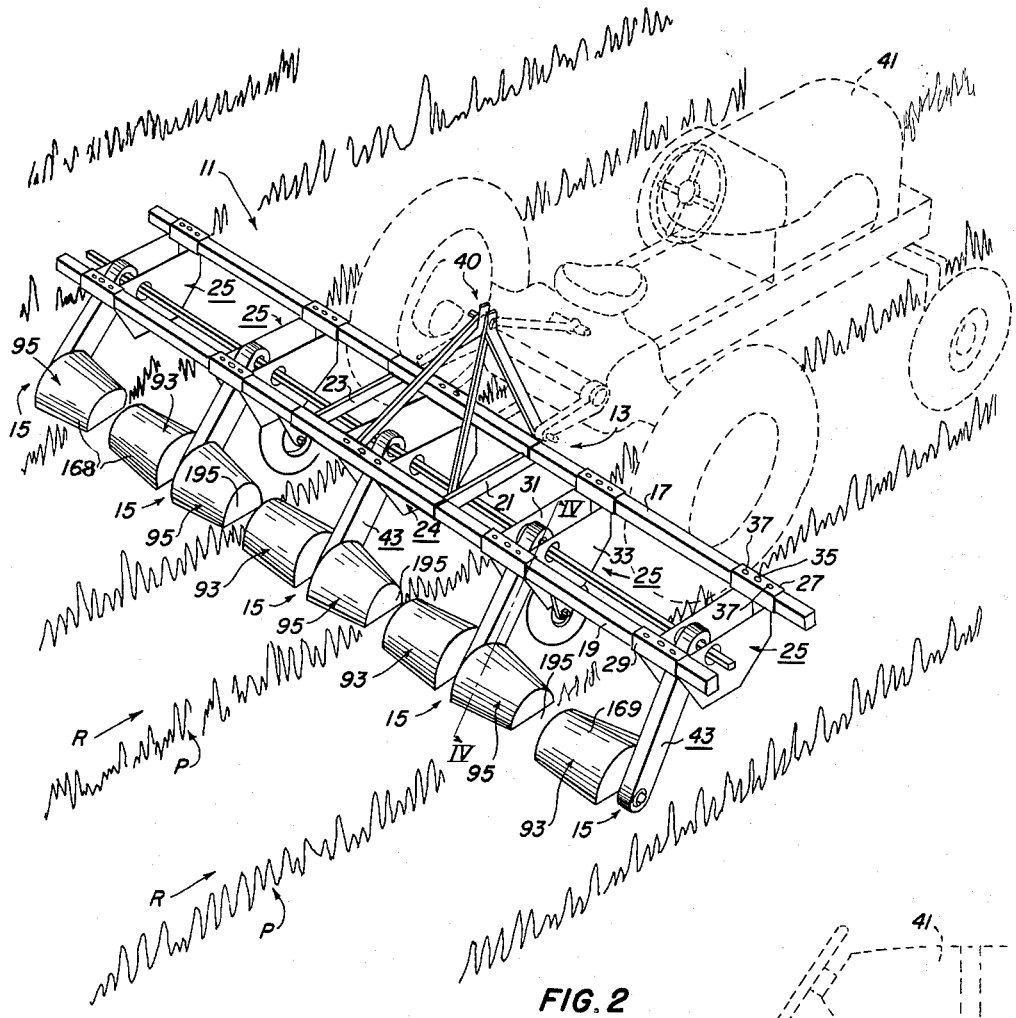
FIG. 1 is a perspective view of the cultivator of the present invention shown in operation and attached to a tractor, with parts being removed for purposes of clarity and with the tractor being shown in dotted lines.

Referring now to the drawings in which the various parts are indicated by numerals, the cultivator 11 of the present invention comprises, in general, a framework 13 and a plurality of cultivator units 15 depending therefrom. Framework 13 preferably includes a pair of elongated transverse members 17, 19 which are in spaced apart relationship and rigidly interconnected by means of members 21, 23. In addition, framework 13 includes a center support assembly 24 and a plurality of other support assemblies 25 that are laterally spaced apart and adjustable, as will be understood from the following description of one of the support assemblies 25. Each support assembly 25 includes a pair of sleeves 27, 29 that are respectively slidably mounted on transverse members 17, 19. Also, each of the support assemblies 25 includes a pair of plates 31, 33 that are respectively fixedly attached adjacent the opposite ends thereof to sleeves 27, 29 and depend downwardly in laterally spaced parallel relationship. Each of the support assemblies 25 is provided with suitable means for the locking thereof in a selected position on transverse members 17, 19, and which means preferably comprises bolts 35 extending through a selected one of apertures 37 in the sleeve and aligned apertures in the transverse members 17, 19.

Center support assembly 24 is substantially the same construction as each of support assemblies 25 except that sleeves 38, 39, which correspond respectively to sleeves 27, 29, are somewhat transversely longer than sleeves 27, 29.

Transverse member 17 is preferably formed in two halves with the adjacent ends of the halves being removably received in sleeve 38, which serves to join the two, and with the halves respectively extending transversely to the right and to the left of center support assembly 24. Transverse member 19 is preferably formed in the same manner as transverse member 17 and with sleeve 39 serving to join the ends thereof.

Figure 2:
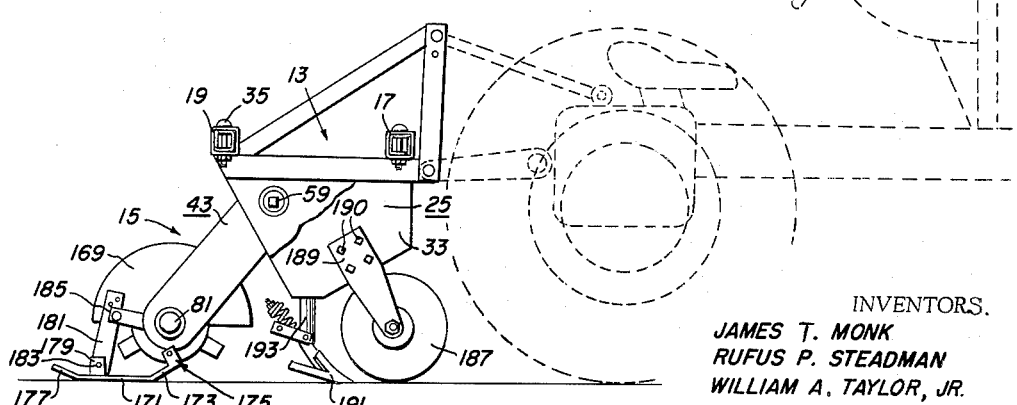
FIG. 2 is a side elevational view of the apparatus of FIG. 1, with a part broken away for illustration purposes.

Suitable means, as a bracket 40 of any suitable construction, such as the so-called three-point type of hitch, is attached to framework 13 adjacent the middle thereof on sleeves 38, 39 and furnishes the means whereby cultivator 11 is removably attached to a tractor, as tractor 41, so that the framework 13 extends transversely rearwardly of the tractor, as shown in FIGS. 1 and 2.

Referring now more specifically to the cultivator units 15, each of the cultivator units and their related parts are substantially identical so that the following description of one will suffice for all:

Each of units 15 comprises an arm which is preferably in the form of an elongated hollow casing 43. At the upper end of casing 43 is a unique arrangement of parts which includes means for pivotally mounting the cultivator units and for driving same. Thus, a pair of inner rings 45, 46 are fixedly attached adjacent the upper end of casing 43 in aligned openings 47, 48 in opposite sides of the casing with the rings extending outwardly from the casing in opposite directions. A pair of outer rings 49, 50 are fixedly attached to plates 31, 33 in aligned openings 51, 52 therein and extend inwardly towards each other from the plates where they respectively turnably and slidably receive inner rings 45, 46. A pair of anti-friction or ball bearing rings 53, 55 are respectively mounted in inner rings 45, 46 with the outer races thereof being fixedly attached to the inner rings and with the inner races thereof being fixedly attached to a sleeve 57 that extends therethrough. Sleeve 57 is slidably mounted on a drive shaft 59 that is preferably square in cross-section and extends through a corresponding square bore, not shown, in the sleeve so that as the drive shaft is rotated by means later to be described, the sleeve 57 rotates therewith. It will be understood that sleeve 57 is laterally slidably on drive shaft 59 to a selected position, and the sleeve is held in such a position by means of the retaining collars 61, 63 provided on the drive shaft at the opposite ends of sleeve 57. Collars 61, 63 are respectively held in place by the set screws 65, 67. Adjacent the lower end of casing 43 is provided a pair of annular flanges 69, 71 that are fixedly attached to the casing in the aligned openings 73, 75 on opposite sides of the casing. A pair of ball bearing rings 77, 79 are respectively mounted in flanges 69, 71 with the outer races of the bearings being respectively fixedly attached to the flanges and with the inner races being fixedly attached to a transverse axle 81 that extends therethrough. Transverse axle 81 is rotatably driven by drive shaft 59 through a continuous chain 87 that extends over a sprocket 89 fixedly mounted on sleeve 53 and over a sprocket 91 fixedly mounted on axle 81. On the axles 81 of the intermediate ones of cultivator units 15 are mounted a left-hand ground engaging cultivator head 93 at one end of the axle and a right-hand ground engaging cultivator head 95 at the opposite end. It will be understood that the right-hand head 95 has been removed in FIG. 4 for purposes of illustration. Also, as best seen in FIG. 1, it will be understood that on the cultivator units at the opposite ends of framework 13 only a single cultivator head is preferably provided, with the one at one end being a left-hand cultivator head 93 and the other at the opposite end being a right-hand cultivator head 95. Cultivator heads 93, 95 are substantially identical in construction, with the exception that one is right-handed and one left-handed, as will be more fully explained later in the specification, and the following description of cultivator head 93 will suffice for both.

Head 93 comprises a substantially frusto-conical base assembly 97 that includes an outer base section 99 and a larger inner base section 101 that forms an extension of the outer base section. The adjacent ends of the base sections 99, 101 are respectively provided with annular inwardly extending flanges 103, 105, so that outer section 99 can be removably attached to inner section 101 by means of bolts 107 extending through aligned apertures in the flanges 103, 105 and held in place by nuts 109. A bearing sleeve 111 is supported axially of inner section 101 by means of an annular support 113 fixedly attached at the inner periphery thereof to sleeve 111 and fixedly attached at the outer periphery thereof to base section 101 on the interior thereof. Support means is additionally provided by a circular end 115 of inner base section 101, which circular end is provided adjacent the larger end of the inner base section 101 and which is fixedly connected to sleeve 111 where the sleeve extends through a central hole 117 in the end 115. End 115 is set back somewhat from the end edge of inner section 101 to establish a rim 119, which overlaps a smaller semi-circular rim 121 fixedly attached to casing 43. Semi-circular rim 121 opens downwardly, that is, the semi-circular rim extends over the upper half of the imaginary circle of which the rim is a part and the lower half is omitted. In addition, a still smaller rim 123 is provided concentrically with rim 119 and overlaps rim 121. Rim 123 is fixedly attached to circular end 115 and extends in the same direction as rim 119. It will be understood that the above described overlapping relationships of the various rims 119, 121, and 123 will prevent grass and the like from getting into the bearings.

Base assembly 97 is mounted on one end of axle 81 preferably by the following means: Sleeve 111 is mounted on axle 81 with the axle extending through the sleeve to support base assembly 97 from the axle. Unless otherwise held, base assembly 97 is rotatable on axle 81. However, axle 81 and base assembly 97 are normally fixedly interconnected so that rotation of the axle will cause rotation of the base assembly. Thus, collar 125 is provided on the end of axle 81 outwardly of sleeve 111, and the collar is keyed to the axle by means of the key 127, which key and collar are retained on the axle by means of a washer 129 and a screw 131 threadedly engaged in a threaded bore in the end of the axle, as best seen in FIG. 4. A lug 133 is fixedly attached to collar 125 and extends radially outwardly therefrom. Another lug 135 is fixedly attached to the inner wall of section 101 and extends radially inwardly in overlapping relationship to lug 133 where it is removably connected by means of a shear bolt 137 having a nut 139 engaged thereon. Flanges 103, 105 are respectively cut out as at 141, 143 so as not to interfere with nut 139 whereby the nut can be reached by a wrench from the outer end of the base assembly. In addition, the circular outer end 145 of outer base section 99 is provided with a central opening 147 therein so that nut 139 and screw 131 can be reached therethrough to remove the base assembly 97 or to disconnect the shear bolt 137.

Additionally, cultivator head 93 includes a plurality of rigid ground engaging projections 149 which are fixedly attached to base assembly 97 and extend radially outwardly from the outer surface 151 of the base assembly. Projections 149 are preferably flat rectangular-shaped pieces, and each terminates in a distal end 153. Projections 149 are preferably of the same length so that the distal ends 153 will lie in a substantially frusto-conical pattern. In other words, since surface 151 is frusto-conical and since the projections 149 are of the same length, they terminate at a place that is disposed in an imaginary frusto-conical shape which is concentric with frusto-conical surface 151 but which is larger than the frusto-conical surface by the length of the projections 149. It will be understood that the same effect could be obtained, without departing from the spirit and scope of the present invention, by having surface 151 cylindrical in shape and having different lengths of projections 149 so that the distal ends thereof terminate in a frusto-conical pattern. Each of the projections 149 is at an angle relative to the axis of base assembly 97. In other words, instead of each of the projections 149 lying in a plane which is perpendicular to the axis of base assembly 97, each of the projections 149 is angled relative to such a plane. It will be understood that the path of movement of the projections 149, when base assembly 97 is rotated, is in a circular path, and the projections are turned relative to this sloping path so that the dirt will be moved or pumped axially of the base assembly towards or away from the plant rows. Thus, for example, the cultivator head 93, shown in FIG. 8, when rotated clockwise, as viewed from the right-hand end in this figure will cause the dirt to be moved towards the plant row or towards the end of head 93 towards the left in this figure. In addition, projections 149 are preferably arranged in a spiral disposition around the base assembly 97 to further cause a pumping effect of the dirt axially of base assembly 97. It will be understood that the direction of rotation, the spiral direction, and the angle of projections 149 will have an effect on the amount and direction of the pumping of the dirt. On a particular cultivator unit 15, it will be understood that the cultivator heads 93, 95 will be rotated in the same direction since they are on the same axle 81, but the angle of the projections 149 and the disposition of the spiral are different for the two heads. For example, the projections 149 on the left-hand cultivator head 93, shown in FIGS. 4 and 8, are arranged in a left-hand spiral, and the projections are angled in such a manner that when the base assembly 97 is rotated in a clockwise direction, as viewed from the right end in FIGS. 4 and 8, the blades will cause the dirt to move to the left. It will be noted that the angle of projections 149 substantially coincides with an imaginary helix line drawn through the projections. Thus, the leading or dirt contacting face 154 of each projection 149 is angled from the leading edge 155 of each projection towards the direction the dirt is pumped. In contrast to this, the disposition of the spiral on head 95 would be opposite, that is, a right-hand spiral, and the projections would be angled the opposite way. The above described example has been given assuming that base assembly 97 is rotated in the same direction as the travel of the device 11 over the ground. This is the preferred direction of rotation. However, it will be understood that the rotation may be in the other direction, or in the opposite direction from the travel of the device 11 over the ground, without departing from the spirit and scope of the present invention.

It will be understood that to reverse the pumping action, it is only necessary to move the base assembly 97 from the left-hand side of shaft 81 and put it on the right-hand side. Then, put the right-hand base assembly on the left-hand side. This reverses the soil engaging surfaces.

As heretofore stated, the rotational drive of base assembly 97 is by means of the rotation of shaft 59 which is driven from the power takeoff of the tractor by suitable means, preferably as follows: A sprocket 156 is fixedly mounted on a sleeve 157 of the center unit 15 which is similar and corresponds to sleeve 57 of the other units in that the sprocket 89 of the center unit is mounted thereon, but sleeve 157 extends to one side more than sleeves 57 to accommodate sprocket 156. Also, sleeve 157 serves to removably join the two ends of shaft 59, which is preferably formed in two halves as transverse members 17, 19. Sprocket 156 is driven by a continuous chain 158 that extends over sprocket 156 and over another sprocket 159 fixedly mounted on a jack shaft 161 that is rotatably supported from framework 13 by suitable means. A bevel gear 163 is fixedly mounted on jack shaft 161 and engages another bevel gear 165 that is fixedly mounted on a shaft 167 which, in turn, is rotatably mounted on framework 13 and coupled to the usual power takeoff shaft, not shown, of the tractor by suitable coupling means, not shown, to rotatably drive shaft 167 in a well-known manner.

A shield 168 is provided for each of heads 93, 95 and is fixedly attached to casing 43. Shield 168 is preferably of the same shape as heads 93, 95 and preferably only covers the upper halves of the heads. In other words, shield 168 preferably has a frusto-conical shape. A vertical end plate 169 is provided adjacent the smaller end of shield 168, as best seen in FIG. 5, and is adjustably mounted from the shield by suitable means as bolt and nut means 170 extending through vertical slots in the shield for clamping the end plate in a selected vertical position, whereby the end plate serves as a means for controlling the amount of dirt pumped towards the plants.

Each of cultivator units 15 is provided with a ground contacting gauge shoe 171 to control the depth of the cultivator heads 93, 95. The forward end portion 173 of gauge shoe 171 is preferably angled upwardly, as best seen in FIG. 2, and is fixedly attached to casing 43 as at point 175 by suitable means. In addition, the rearward end portion 177 is preferably slightly angled upwardly. Intermediate the ends of gauge shoe 171 is provided a bracket 179 that is fixedly attached to the gauge shoe and upstands therefrom, where an upstanding member 181 is connected thereto by means of a bolt 183. Upstanding member 181 is adjustably connected to a bracket 185 so that the member 181 may be moved upwardly and downwardly to control the depth of the particular one of the cultivator heads 93, 95 to which attached. Bracket 185, in turn, is fixedly attached to casing 43.

A pair of ground engaging depth control wheels 187 are respectively rotatably mounted in laterally spaced relationship on depending arms 189 with the depending arms being adjustably attached to framework 13 as by bolts 190 so that the height of the framework can be selectively changed.

A plurality of sweeps 191 are respectively fixedly mounted from framework 13 in front of cultivator units 15 by suitable means as support arms 193 respectively fixedly attached to the framework 13 and depending therefrom, where the sweeps are respectively mounted adjacent the lower ends thereof.

In the operation of cultivator 11, the cultivator is moved along the rows by the tractor 41, as, for example, along the rows R of plants P shown in FIG. 1. It will be noted that for each row R, there is a pair of cultivator heads, that is, a right-hand head 95 and a left-hand head 93, which extend inwardly towards one another but with a space 195 therebetween through which the plants P pass. Also, it will be noted that the smaller ends of the frusto-conical heads are adjacent the row and the larger ends are outwardly therefrom. In addition, it will be seen that the transverse members 17, 19 are elevated high above the plants P so that the plants can be cultivated even though they are tall. When the cultivator 11 is moved along the rows, as above described, a very efficient cultivating action is provided. Thus, the sweeps 191 cause the dirt to flow into the cultivator heads 93, 95; the row along either side of the plants is cultivated; and some of the soil is laterally pumped in towards or away from plants P.

It will be seen from the foregoing that the framework 13, as a whole, rises and falls in accordance with the depth gauge wheels 187, which at the same time cause the sweeps 191 to rise and fall together. Also, the individual cultivator units 15 rise and fall separately in accordance with the individual gauge shoes 171. In addition, it will be understood that for wide rows, the complete base assembly 97 is adapted to be used, and with smaller width rows the outer base section 99 can easily be removed by removing bolts 107 and nuts 109. Also, if it is desired to pump the dirt away from the plants P, it will be understood that on a particular unit 15 the right-hand cultivator head 95 can be substituted for the left-hand cultivator head 93, and the left-hand cultivator head put in place of the right-hand cultivator head. It will be understood that this swapping of the heads, 93, 95 can be easily and quickly done since it is only necessary to remove and replace screws 131.

Also, it will be understood that the cultivator is adapted to be furnished as a four-row machine, as shown in FIG. 1, or as a two-row or one-row machine, since transverse members 17, 19 and shaft 59 are in two pieces in the four-row machine. Thus, when the two-row machine is desired, the end ones of units 15 shown in FIG. 1 are moved in behind the tractor tires; depth control wheels 187 are mounted on these end units; and the intermediate ones of units 15 between the end units and the center unit are not used. Also, it will be understood that only one of the halves of each of the transverse members 17, 19 and shaft 59 need be used, with these being respectively centered up behind the tractor in sleeves 38, 39 and 157 and locked in place. For the one-row machine, transverse members 17, 19 and shaft 59 are not required, but only the center unit is used.

Although the invention has been described and illustrated with respect to a preferred embodiment thereof, it is to be understood that it is not to be so limited since changes and modifications may be made therein which are within the full intended scope of this invention as hereinafter claimed.

We claim:

1. In a cultivator for rows of plants, a framework, means attached to said framework for mounting said framework on a tractor for movement over the ground and over the plants, a transversely extending shaft, drive means coupled to said shaft for the rotation thereof, a plurality of cultivator units; each of said cultivator units comprising a casing, pivotal means pivotally mounting said casing on said framework with said casing depending therefrom, said pivotal means including at least a pair of overlapping rings turnably and slidably mounted relative to each other with one of said rings being fixedly attached to said framework and the other of said rings being fixedly attached to said casing, said shaft extending through said rings, bearing means interposed between said shaft and said other of said rings for rotatably supporting said shaft from said framework, an axle, bearing means rotatably supporting said axle in said casing adjacent the lower end thereof and extending laterally therefrom in a direction substantially transverse relative to the direction of movement of said framework, a substantially frusto-conical base assembly including an outer base section and a larger inner base section in end-to-end relationship therewith and means removably holding said sections together, a sleeve, means fixedly attaching said sleeve to said base assembly with said sleeve extending axially thereof, said sleeve being rotatably mounted on said axle to support said base assembly therefrom, shear pin means entirely in the interior of said base assembly and interconnecting said sleeve and said base assembly for causing rotation of said base assembly upon rotation of said axle, motion transmission means connecting said axle with said shaft for rotation therewith, a plurality of flat rectangular ground penetrating projections mounted on said base assembly and extending outwardly from said base assembly, said projections terminating in distal ends remote from said base assembly, said distal ends being disposed in a substantially frusto-conical pattern, said projections being arranged in a spiral disposition on said base assembly, each of said projections being disposed at an angle relative to the axis of rotation of said base assembly for moving the dirt axially of said base assembly, said projections substantially coinciding with an imaginary helix line drawn through said projections, a ground engaging slide, means attaching said slide to said casing for controlling the depth of penetration of said projections into the ground; a sweep, and means mounting said sweep from said framework forwardly of said cultivator units for throwing dirt into the path of said cultivator units, a ground engaging depth control wheel, and means mounting said depth control wheel from said framework for controlling the height above the ground of said framework.

2. In a cultivator for rows of plants, a framework, means attached to said framework for mounting said framework on a tractor for movement over the ground and over the plants, a transversely extending shaft, means rotatably supporting said shaft from said framework, drive means coupled to said shaft for the rotation thereof, a plurality of cultivator units respectively disposed in the spaces between said rows of plants and each of said cultivator units including a pair of earth-working heads disposed between an adjacent pair of rows of plants; each of said cultivator units additionally comprising a casing, pivot means pivotally mounting said casing on said framework with said casing depending therefrom and being adapted to depend between adjacent rows of plants in substantially centered relationship thereto, an axle, bearing means rotatably supporting said axle in said casing adjacent the lower end thereof and extending laterally therefrom in a direction substantially transverse relative to the direction of movement of said framework, said pair of earth-working heads being mounted on said axle for rotation therewith, said earth-working heads being disposed on opposite sides of said casing and extending laterally in opposite directions for respectively working on adjacent sides of adjacent rows of plants, motion transmission means connecting said axle with said shaft for rotation therewith, said earth-working heads having a substantially frusto-conical shape, a ground engaging slide, means attaching said slide to said casing rearwardly of said pivot means for controlling the depth of penetration of said heads into the ground; a plurality of sweeps, and means respectively mounting said sweeps from said framework forwardly of and between said pair of earth-working heads of said cultivator units for throwing dirt into the paths of said earth-working heads of said cultivator units, a ground engaging depth control wheel, and means mounting said depth control wheel from said framework for controlling the height above the ground of said framework.

3. In a cultivator for rows of plants, a framework, means attached to said framework for mounting said framework on a tractor for movement over the ground and over the plants, a transversely extending shaft, means rotatably supporting said shaft from said framework, drive means coupled to said shaft for the rotation thereof, a plurality of cultivator units respectively disposed in the spaces between said rows of plants and each of said cultivator units including a pair of earth-working heads disposed between an adjacent pair of rows of plants; each of said cultivator units additionally comprising a casing, pivot means pivotally mounting said casing on said framework with said casing depending therefrom and being adapted to depend between adjacent rows of plants in substantially centered relationship thereto, an axle, bearing means rotatably supporting said axle in said casing adjacent the lower end thereof and extending laterally therefrom in a direction substantially transverse relative to the direction of movement of said framework, said pair of earth-working heads being mounted on said axle for rotation therewith, said earth-working heads having a substantially frusto-conical shape, said earth-working heads being disposed on opposite sides of said casing and extending laterally in opposite directions for respectively working on adjacent sides of adjacent rows of plants, motion transmission means connecting said axle with said shaft for rotation therewith, a plurality of sweeps, and means respectively mounting said sweeps from said framework forwardly of and between said pair of earth-working heads of said cultivator units for throwing dirt into the paths of said earth-working heads of said cultivator units.

4. In a cultivator for rows of plants, a framework, means attached to said framework for mounting said framework on a tractor for movement over the ground and over the plants, said framework including a plurality of laterally spaced support means adjustably mounted for lateral adjustment, a transversely extending shaft, drive means coupled to said shaft for the rotation thereof, a plurality of laterally spaced cultivator units; each of said cultivator units comprising a casing, pivotal means pivotally mounting said casing on one of said support means with said casing depending therefrom in position for aligning between adjacent rows of plants in substantially centered relationship thereto, said pivotal means including at least a pair of overlapping rings turnably and slidably mounted relative to each other with one of said rings being fixedly attached to said support means and the other of said rings being fixedly attached to said casing, said shaft extending through said rings, bearing means interposed between said shaft and said other of said rings for rotatably supporting said shaft from said support means, an axle, bearing means rotatably supporting said axle in said casing adjacent the lower end thereof and extending laterally therefrom in a direction substantially transverse relative to the direction of movement of said framework, motion transmission means connecting said axle with said shaft for rotation therewith, a pair of earth-working heads mounted on said axle for rotation therewith, said earth-working heads having a substantially frusto-conical shape, said earth-working heads being disposed on opposite sides of said casing and extending laterally in opposite directions for respectively working on adjacent sides of adjacent rows of plants.

5. A cultivator for cultivating rows of plants comprising a transversely elongated framework including a center support assembly having a pair of transversely extending parallel and spaced sleeves, a pair of transverse members with each being in separate end-to-end halves, said transverse members being respectively removably received in said sleeves with adjacent ends of said halves being held together by said sleeves, a pair of additional support assemblies removably and adjustably mounted on said transverse members on one side of said center support assembly in transversely aligned relationship therewith, another pair of additional support assemblies removably and adjustably mounted on said transverse members on the other side of said center support assembly in transversely aligned relationship therewith, a plurality of cultivator units respectively mounted on said center support assembly and said additional support assemblies with all of said cultivating units being in transversely aligned relationship with one another and adapted to be respectively centered between adjacent rows of plants, all of said additional support assemblies and said center support assembly being in transverse alignment with one another and means attached to said center support assembly for mounting said framework on a tractor for movement over the ground and over the plants.

6. The cultivator of claim 5 in which each of said cultivator units includes a rotatably driven base means and a plurality of flat ground penetrating projections mounted on said base means and extending outwardly therefrom.

7. The cultivator of claim 6 in which each of said projections are rectangular and are disposed at an angle for moving the dirt towards the plants.

8. The cultivator of claim 6 in which each of said projections are rectangular and are disposed at an angle relative to the axis of rotation of said base means in such a manner that said projections substantially coincide with an imaginary helix line drawn through said projections.

9. In a cultivator for a plurality of spaced rows of plants adapted to be mounted on a tractor for movement over the ground and over the plants, a plurality of duplicate pairs of cultivator heads, said pairs being positioned for respectively extending into the spaces between said rows of plants and with each pair being disposed for working on adjacent sides of an adjacent pair of rows of plants, means coupled to each of said pairs of heads for the rotational drive thereof about a horizontal axis extending in a direction substantially transverse relative to the direction of movement over the ground, each of said cultivator heads including base means and a plurality of flat ground penetrating projections mounted on said base means and extendig outwardly therefrom, said projections being disposed at an angle relative to the axis of rotation of said base means in such a manner that said projections coincide with an imaginary helix line drawn through said projections and said projections having the distal ends thereof disposed in a substantially frusto-conical pattern; each of said cultivator heads comprising an inner base section, an outer base section, and means including radially projecting flanges detachably coupling said inner base section and said outer base section in end-to-end relationship for wide rows; said inner base section on said outer base section being tapered and with the same contour being maintained, and said outer base section being removable for narrower rows.

References Cited by the Examiner

UNITED STATES PATENTS

| | | | |
|---|---|---|---|
| 361,866 | 4/87 | Erwin | 172—113 X |
| 842,119 | 1/07 | Scott | 172—60 X |
| 1,289,884 | 12/18 | Opalka | 172—60 |
| 2,176,261 | 10/39 | Kelsey | 172—60 |
| 2,317,188 | 4/43 | Hanson | 172—60 |
| 2,616,348 | 11/52 | Ariens | 172—60 |
| 2,657,620 | 11/53 | Meeks | 172—123 X |
| 2,663,131 | 12/53 | Johnson | 172—554 |
| 2,681,607 | 6/54 | Glover | 172—60 |
| 2,750,859 | 6/56 | Smithburn | 172—103 X |
| 2,935,139 | 5/60 | Dede | 172—60 |
| 3,136,373 | 6/64 | Bonomo et al. | 172—60 |

FOREIGN PATENTS

| | | |
|---|---|---|
| 1,205,709 | 8/59 | France. |
| 1,245,977 | 10/60 | France. |
| 833,567 | 3/52 | Germany. |
| 11,297 | 7/46 | Great Britain. |

ABRAHAM G. STONE, *Primary Examiner.*